US007837749B2

(12) United States Patent
Seeley et al.

(10) Patent No.: US 7,837,749 B2
(45) Date of Patent: Nov. 23, 2010

(54) SYSTEM AND METHOD FOR MONITORING IMPACT MACHINERY

(75) Inventors: Charles Erklin Seeley, Niskayuna, NY (US); Eladio Clemente Delgado, Burnt Hills, NY (US); John Erik Hershey, Ballston Lake, NY (US); Harold Woodruff Tomlinson, Jr., Ballston Spa, NY (US); David Fulton Johnston, Poquoson, VA (US); Terry Lewis Farmer, Kearney, MO (US)

(73) Assignee: General Electric Company, Niskayuna, NY (US)

( * ) Notice: Subject to any disclaimer, the term of this patent is extended or adjusted under 35 U.S.C. 154(b) by 973 days.

(21) Appl. No.: 11/426,955

(22) Filed: Jun. 28, 2006

(65) Prior Publication Data

US 2008/0000355 A1 Jan. 3, 2008

(51) Int. Cl.
*B01D 39/00* (2006.01)

(52) U.S. Cl. ............................ 55/283; 55/300; 55/482; 96/417; 96/418; 96/420; 96/421; 96/423; 96/6; 96/33; 96/74; 96/76

(58) Field of Classification Search .................... 96/18, 96/22–24, 30–39, 65, 417–423; 55/283, 55/300, 482; 95/2, 6–7, 18, 22, 32–33, 76, 95/59, 74

See application file for complete search history.

(56) References Cited

U.S. PATENT DOCUMENTS

| | | | |
|---|---|---|---|
| 4,893,490 A | 1/1990 | Isnardon et al. | |
| 5,210,456 A | 5/1993 | Suzuki | |
| 5,987,992 A * | 11/1999 | Watanabe et al. | 73/632 |
| 6,169,479 B1 | 1/2001 | Boran et al. | |
| 6,204,756 B1 | 3/2001 | Senyk et al. | |
| 6,540,812 B2 * | 4/2003 | Farmer et al. | 95/2 |
| 6,786,075 B2 * | 9/2004 | Radke et al. | 73/24.06 |
| 2004/0140903 A1 | 7/2004 | Buhler | |
| 2005/0188853 A1 * | 9/2005 | Scannell, Jr. | 96/417 |

* cited by examiner

*Primary Examiner*—Jason M Greene
*Assistant Examiner*—Karla Hawkins
(74) *Attorney, Agent, or Firm*—Ann M. Agosti

(57) ABSTRACT

A system (10) for monitoring an operating condition of an electrostatic precipitator rapper system (12) includes a rapper (24) configured to mechanically actuate to disengage pollutants from a plate of the electrostatic precipitator (12). The system also includes a sensor (38, 40) configured to obtain and transmit signals representative of vibration, motion, or current behavior of the rapper; and a processor (52) configured to receive the signals from the sensor and to detect whether the rapper is mechanically actuated.

7 Claims, 9 Drawing Sheets

SYSTEM AND METHOD FOR MONITORING IMPACT MACHINERY

BACKGROUND

The invention relates generally to impact machinery that undergoes heavy vibrations under operation. More specifically, the invention relates to a system and method for monitoring rappers in an electrostatic precipitator.

Many industrial operations produce exhaust gases that contain dust, fly ash (unburned constituents from burning), fumes (fine elemental particles such as cadmium, sulfur and lead) and mist (such as coal tar), which are undesirable for the environment. One widely used method of removing such contaminants from a gas stream is to use an electrostatic precipitator (ESP).

In one example, electrostatic precipitators are composed of metallic plates subjected to a potential difference in order to exploit the corona activity and capture the electrostatically charged dust of the smoke exiting from the smokestack of a factory. The plates are bumped at regular intervals for dust removal by using rappers, and the dust is then collected at the bottom of the electrostatic precipitators. Rappers include machinery that creates an impact as part of its normal operation and needs to be carefully monitored for performance, efficiency, and safety reasons. For example, electromagnetic rappers are used to knock dust off of electrostatic precipitator (ESP) plates by lifting a heavy slug using an energized electric coil and then dropping the slug onto the ESP plate at periodic intervals. The resulting impact is several hundred times normal earth gravity. A precipitator may have several hundred rappers, and it is not practical to monitor all of them manually.

Conventional shock and vibration instrumentation includes accelerometers and signal analyzers. Employing such equipment is expensive and cumbersome. For example, to fit the monitoring equipment within a small space so as not to interfere with normal operation involves expensive modifications to available equipment. Additionally, supplying power and data lines to each unit is a challenge with respect to logistics and installation. Furthermore, conventional sensors are often not sufficiently rugged to withstand the temperature, pressure, electromagnetic interference, or combinations thereof in the harsh environments of the type which are experienced by ESPs for extended periods of time.

It is increasingly becoming important to have better operating and maintenance procedures for electrostatic precipitators and other impact machinery and apparatuses.

BRIEF DESCRIPTION

According to one embodiment a system for monitoring an operating condition of an electrostatic precipitator is provided. The system includes a rapper configured to mechanically actuate to disengage pollutants from a plate of the electrostatic precipitator. The system also includes a sensor configured to obtain and transmit signals representative of vibration, motion, or current behavior of the rapper; and a processor configured to receive the signals from the sensor and to detect whether the rapper is mechanically actuated.

According to another aspect a method for retrofitting a rapper in an electrostatic precipitator is provided. The method includes mounting a sensor on top of a slug in the rapper; providing a hole on top of the rapper; and providing an intermediate device on top of a rapper surface. The method also includes placing the slug in a rapper mount; placing a coil over the slug in the rapper mount; and placing a case over the slug and the coil. The method further includes tightening the case; and coupling the intermediate device to a rapper power cable.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
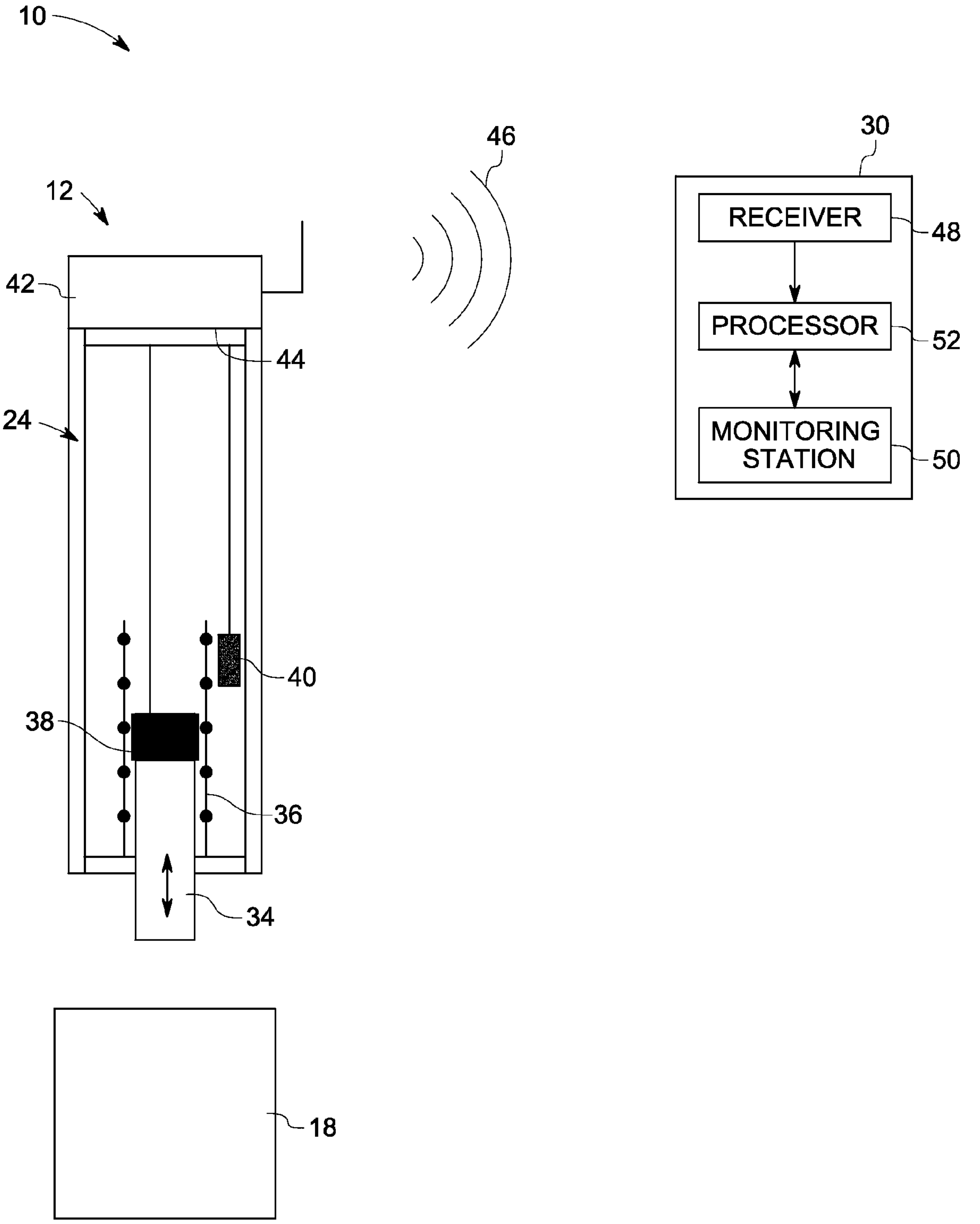
FIG. 1 is a diagrammatic representation of a system for monitoring an operating condition of the rappers in an electrostatic precipitator.

FIG. 1 is a diagrammatic representation of a system 10 for monitoring the operating conditions of an electrostatic precipitator rapper system 12. The system 10 is used more specifically for monitoring the operating condition of a rapper 24. The electrostatic precipitator is used for extracting pollutants such as particles caught in the flow of gas that move through a collector chamber (not shown) or passageway containing sets of collecting electrodes 18 in the form of parallel plates, bundles of tubes, or simply the collector's inner walls. The plates, tubes or inner walls serve as grounded electrodes that act as particle collectors. Discharge electrodes (not shown) are situated within but insulated electrically from the rest of the collector chamber and are charged with high direct voltage via a high voltage power supply. The electrical charge ionizes (charges) the suspended particles, causing them to move toward the collecting electrodes. In another example (not shown) of the electrostatic precipitator, opposite high voltages (plus and minus) are charged on two plates or grids. The positive grid charges the particles, and the negative grid attracts (collects) them.

If the material collected is dry, every so often the collecting electrodes are tapped or rapped by using a rapper 24 (which is also referred to as a bumper) to loosen the layer of particles, which fall into hoppers (not shown) for collection and disposal. The rapper 24 in an exemplary embodiment includes a sensor (meaning one or more sensors, for example a sensor 38 and a sensor 40). A communication path 46 is provided to communicate with a base station 30 via an intermediate device 42. The rapper 24 is configured to be electromechanically actuated in order to disengage pollutants from collector plates as described herein above. For example, as explained above, the electromagnetic rappers knock dust off of electrostatic precipitator plates (collector plates) by lifting a heavy slug 34 using an energized electric coil 36 and then dropping the slug 34 onto the collector plate 18 at periodic intervals. The electrostatic precipitator is thus able to extract pollutants and release clean gas or air. It may be noted that the configuration of the electrostatic precipitator as shown and described herein is merely a non-limiting exemplary illustration and that other configurations for the electrostatic precipitator as well as other apparatus where vibration analysis would be beneficial are equally applicable. Additionally, as used herein words such as "a" and "an" are intended to mean at least one. Often multiple electrostatic precipitators, sensors, rappers, and plates will be present, but individual ones are shown and described herein for ease of illustration and description.

The sensors 38 and 40 are configured to obtain and transmit signals representative of vibration, motion, or current behavior (with "or" meaning vibration, current, or both) of the rapper. As used herein, "motion" means velocity and/or position. Some exemplary implementations of the sensors are shown in FIGS. 2-6. In one example, the sensor 38 is a piezoelectric sensor that is disposed on the slug 34 and is configured to detect the vibration of the slug at multiple instances when a mechanical stimulus is applied on the rapper 24. The piezoelectric sensor is advantageous due to its ruggedness. The piezoelectric sensor output (for example amplitude and frequency information) is correlated to slug height, rapping force and rapper operation in order to detect the vibration and mechanical operation of the rapper. The sensors used herein may also sense the signal representative of the velocity/position and force of the slug movement during vibration.

In an exemplary embodiment, the slug in the wrapper system is activated by separately providing current to coil 36. The slug motion activates the piezo element in the piezoelectric sensor that causes it to produce the electric charge that is directly proportional to the amplitude of the mechanical stimulus. Thus, the amplitude of the mechanical stimulus can be measured by recording the voltage or current produced by the piezoelectric sensor. In the embodiments described herein, the voltage produced by the piezoelectric material, which is proportional to the amplitude of the shock force, which is in turn proportional to the height from which the slug was dropped, is recorded by the sensor 38 or 40 and relayed to the receiver 48. In another embodiment the sensor 40 detects the current or voltage in the electromagnetic coil 36 at multiple instances (multiple instances of mechanical actuation of the rappers).

Figure 4:
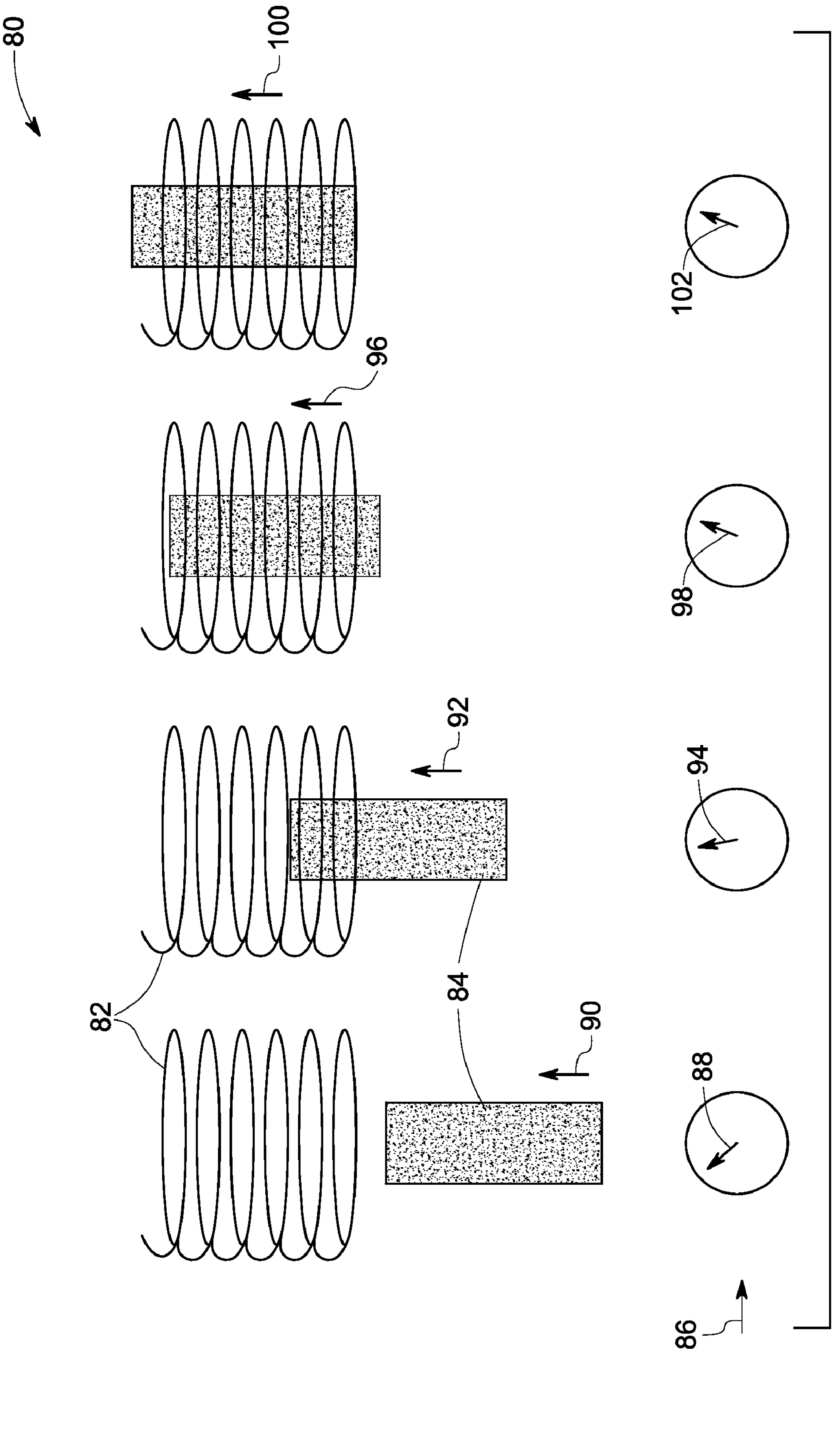
FIG. 4 is a diagrammatic representation of an exemplary embodiment using inductance to measure the operating condition of the rapper.
Figure 5:
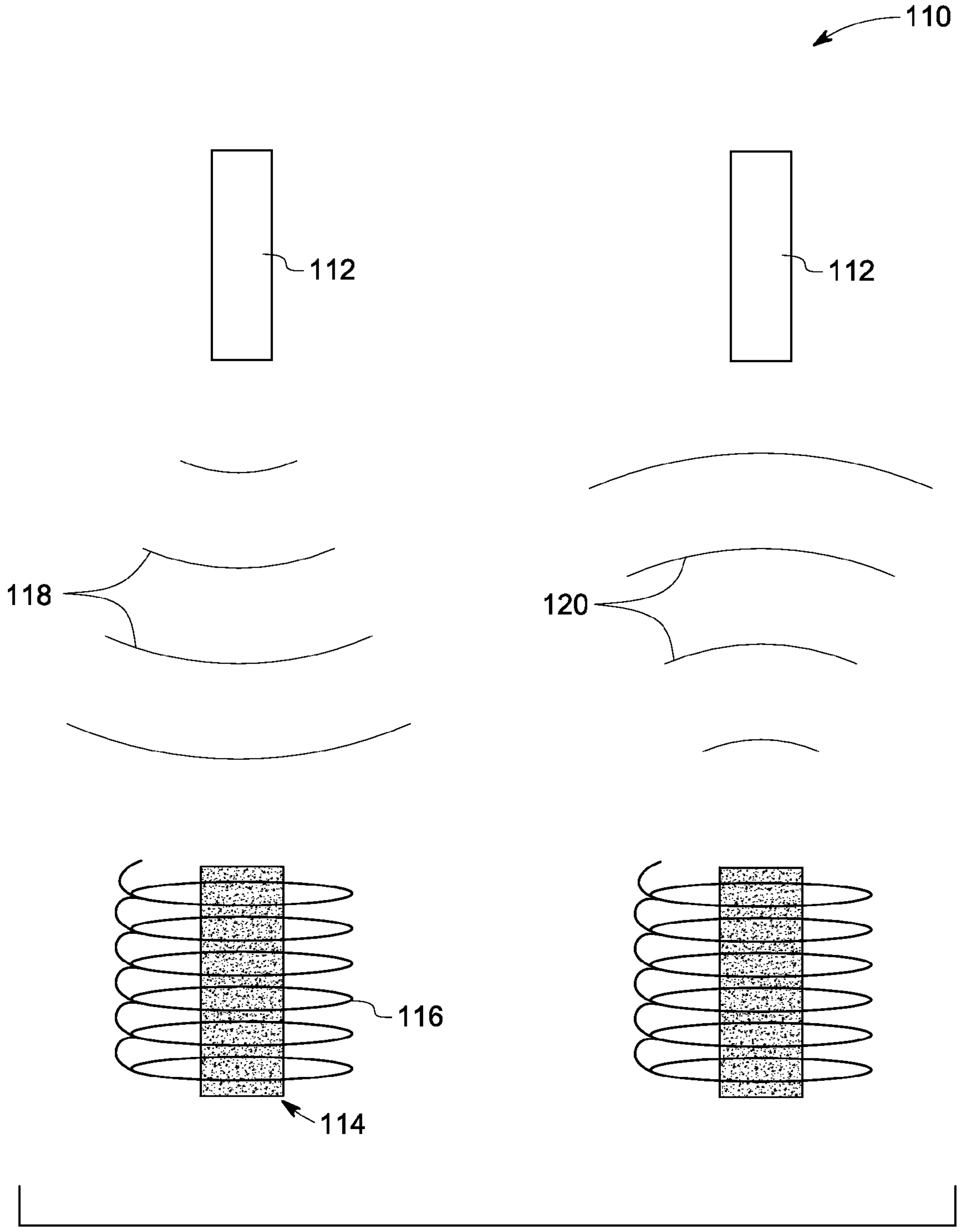
FIG. 5 is a diagrammatic representation of an exemplary embodiment showing an ultrasound sensor.
Figure 6:
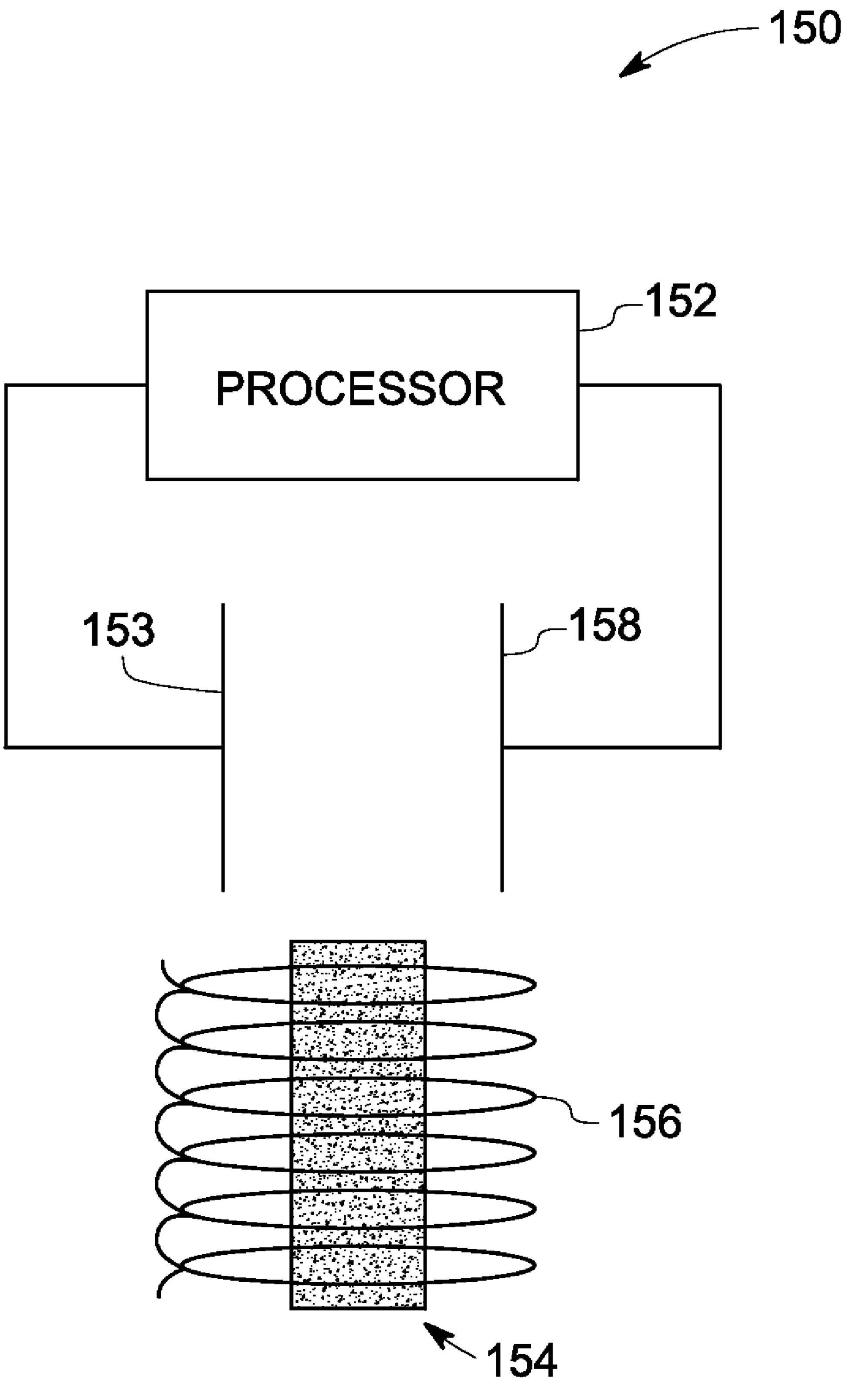
FIG. 6 is a diagrammatic representation of an exemplary embodiment showing a capacitive sensor.

It would be appreciated by those skilled in the art that piezoelectric sensor 38 is used as an exemplary sensor but other sensors such as radio frequency, laser, or ultrasound sensors may additionally or alternatively be employed, some of the exemplary sensors are described in more detail in reference to FIGS. 4-6. The sensor to be selected will need to be able to withstand the intended operating environment.

In the specific example of FIG. 1, the base station 30 comprises the receiver 48, a monitoring device 50, and a processor 52. "Processor" as used herein means any analog or digital device (which may also include a CPU in a multipurpose or application specific computer or work station) for processing an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Referring to FIG. 1, the receiver 48 receives the signals transmitted by the intermediate device 42. These signals are processed in the processor 52 described in more detail below. The monitoring device 50 may be configured to send control signals via the communication link 46 to the rapper 24 for controlling one or more parameters of the rapper based on the signals processed by the processor 52. Some of the operating parameters being measured or determined include force, velocity, acceleration, and position of the slug or the rapper. In another example the operating parameters may include particulate thickness on the collector plates and particulate resistance (voltage across the electrostatic precipitator). The signal from piezoelectric sensor indicates a "hit" of the rapper, the voltage output indicates force and the particle resistivity may be calculated from time history. In an exemplary embodiment the sensors are installed into each unit of machinery to be monitored that is either self contained or linked or coupled to a base station for data display and operation decision making. It would be appreciated by those skilled in the art that the sensors (transmitters/receivers), intermediate devices, and monitoring devices may be a part of communication system and these may be wired or wireless in configuration.

It would be appreciated by those skilled in the art that the processing may be performed at the base station, at the intermediate device, the sensor location, or at any combination of these locations. The processor 52 may also include control features for controlling the input from the sensors 38 and 40. The processor 52, in an exemplary implementation, is configured to receive the signals from the one or more sensors 38, 40 or from the receiver 48 and configured for detecting whether the rapper 24 is mechanically actuated or not. The processor 52 in a specific example is configured to determine one or more operating parameters of the rapper based on the signals received from the sensors 38, 40. In an exemplary embodiment a light emitting diode, or other light emitting device (not shown) may be mounted on the intermediate device so that the light emitting diode is lighted when the rapper operation goes inside or outside a threshold range. In yet another embodiment, the sensors 38 and 40 are electronic signal generators located remotely from the rapper and the processor 52 is a computational device that may be co-located with the sensors.

Figure 2:
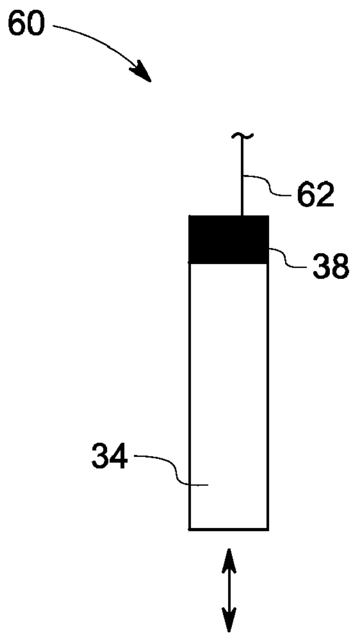
FIG. 2 is a diagrammatic representation of an exemplary configuration showing the sensors in a wired arrangement in the system of FIG. 1.

FIG. 2 is a diagrammatic representation of another exemplary configuration 60 showing the sensor 38 in a wired arrangement disposed on the slug 34 within the rapper 24. The sensor 38 may be a single piezo device that acts as both sensor and energy generator as discussed above. A wire 62 may be employed to electrically couple the sensor 38 with the intermediate device or the base station. In a specific configuration the wire may be stabilized within the rapper using a rubber band, a retracting pulley, or a helical shaped wire (not shown).

Figure 3:
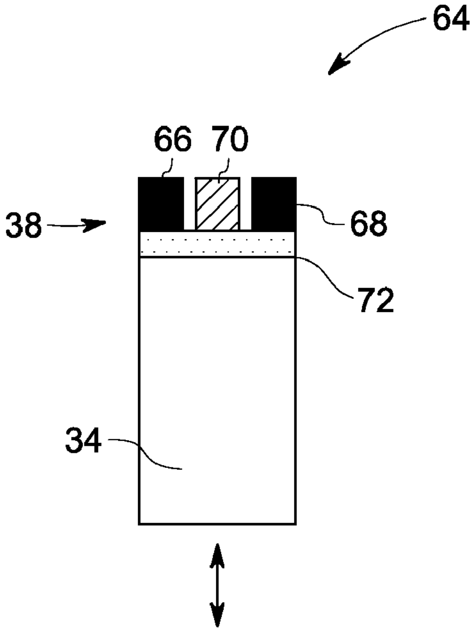
FIG. 3 is a diagrammatic representation of yet another exemplary embodiment showing the sensor in a wireless configuration in the system of FIG. 1.

FIG. 3 is a diagrammatic representation of yet another exemplary arrangement 64 showing the sensor 38 in a wireless configuration. The sensor 38 includes a piezo device 66 for generating power and another piezo device 68 for sensing. In certain embodiments a single piezo device may be employed for both generating power and for sensing. Alternately, in another embodiment both the piezo devices may be used for both generation of power and sensing. The sensor 38 may also include a low power transmitter 70 for relaying the signals to the intermediate device or the base station. The sensor 38 may be attached to the slug with screws or adhesive backing 72. The sensor systems used may include other components such as an antenna, transponders, micro controllers, regulators and rectifiers. In one example, the size of the exemplary arrangement is no wider than that the diameter of the slug 34 so as to not impede the motion of the slug inside of the rapper.

In another exemplary embodiment 80 as shown in FIG. 4, a sensor 86 is coupled to a solenoid coil 82 of the rapper system. The coil is energized by an energizing circuit (not shown), and, as discussed above, is used to raise the slug 84 inside the rapper for dropping. As shown in FIG. 4, the slug 84 is pulled up by the magnetic field generated by current flowing through the coil 82 so that at different time instants the slug 84 fills more and more of the volume inside the coil 82, as shown by the arrows 90, 92, 96, 100. Due to this motion the magnetic permeability changes, and thus the inductance of the coil 82 also changes. Therefore, the slug position is directly related to the inductance of the coil. The inductance in this exemplary embodiment, is obtained by measuring the time varying impedance of the coil 82, which in turn is obtained from measuring the time varying voltage and current. Under operation, an alternating current is passed through the coil 82, superimposed on the actuation current, and the inductive impedance is measured. This measurement may be done locally or remotely from a control room or other easily accessed area by a sensor or current measuring device shown generally as 86. The imposed alternating current is different and distinct in amplitude and frequency from the coil energizing circuit and will not affect it or be affected by it. This operation is similar to that of a linear differential variable transformer (LDVT), a term and technique that is well known in the electrical arts.

The arrows 88, 94, 98, 102 indicate the time varying inductance of the coil 82. Arrow 88 indicates a low impedance value when the slug 84 is outside of the coil 82 and the impedance is low. Arrow 94 indicates an increase in impedance as the slug 84 enters the coil 82. Arrow 98 indicates a maximum impedance value when the slug 84 is completely inside the coil 82. Arrow 102 continues to indicate the maximum inductance value when the slug 84 moves beyond the coil 82. Thus, by measuring the time varying inductance, an estimate of the slug's upward velocity and deceleration may be computed and the rapper's functioning validated as proper or flagged as defective.

In another exemplary embodiment 110 as shown in FIG. 5, the sensor may be an ultrasonic transducer 112 located generally directly above the slug 114 and the coil 116, inside the rapper case (not shown). The processor (not shown) is a computational device that may be co-located with the sensor or remote to the sensor. In this embodiment an ultrasonic-based method is used for measuring the position of the slug. The ultrasonic transducer 112 transmits an acoustic waveform 118 that is reflected at the top of the slug 114. The reflected waveform 120 is then received at the ultrasound transducer 112 which is set to receive the reflected waveform and measure the time between transmission and reception. By replicating this procedure a plurality of times over the cycling of the slug 114 as it moves under the influence of the coil 116, a computer, not shown, can estimate the slug's position, upward velocity and deceleration and assess whether or not the rapper is operating properly.

In yet another embodiment, as illustrated in FIG. 6, the sensor is a capacitive sensor 150 including electrodes 153 and 158 which are coupled to a processor 152. As slug 154 rises towards electrodes 153 and 158, the capacitance increases. Processor 152 is similar to the one described in reference to other embodiments and is a computational device that may be co-located with the electrodes or remote to the electrodes. The capacitance is measured and the values are used to estimate the position of the top of the slug. By replicating this procedure a plurality of times over the cycling of the slug 154 as it moves under the influence of the coil 156, processor 152 may be used to estimate the slug's upward velocity and deceleration and assess whether or not the rapper is operating properly. Only one pair of electrodes is shown, but multiple pairs may be used if desired.

In the various sensing embodiments described herein, two exemplary techniques for harvesting vibration energy and converting it to electrical energy may additionally be used. One technique utilizes piezoelectric materials that create a charge in response to a mechanical stimulus. Repeated stimuli, such as from a shock or vibration, results in a change in the charge with respect to time. This change in charge is a current that can be conditioned with electronics to be used immediately, or temporarily stored on a capacitor, or used to recharge a battery.

Figure 7:
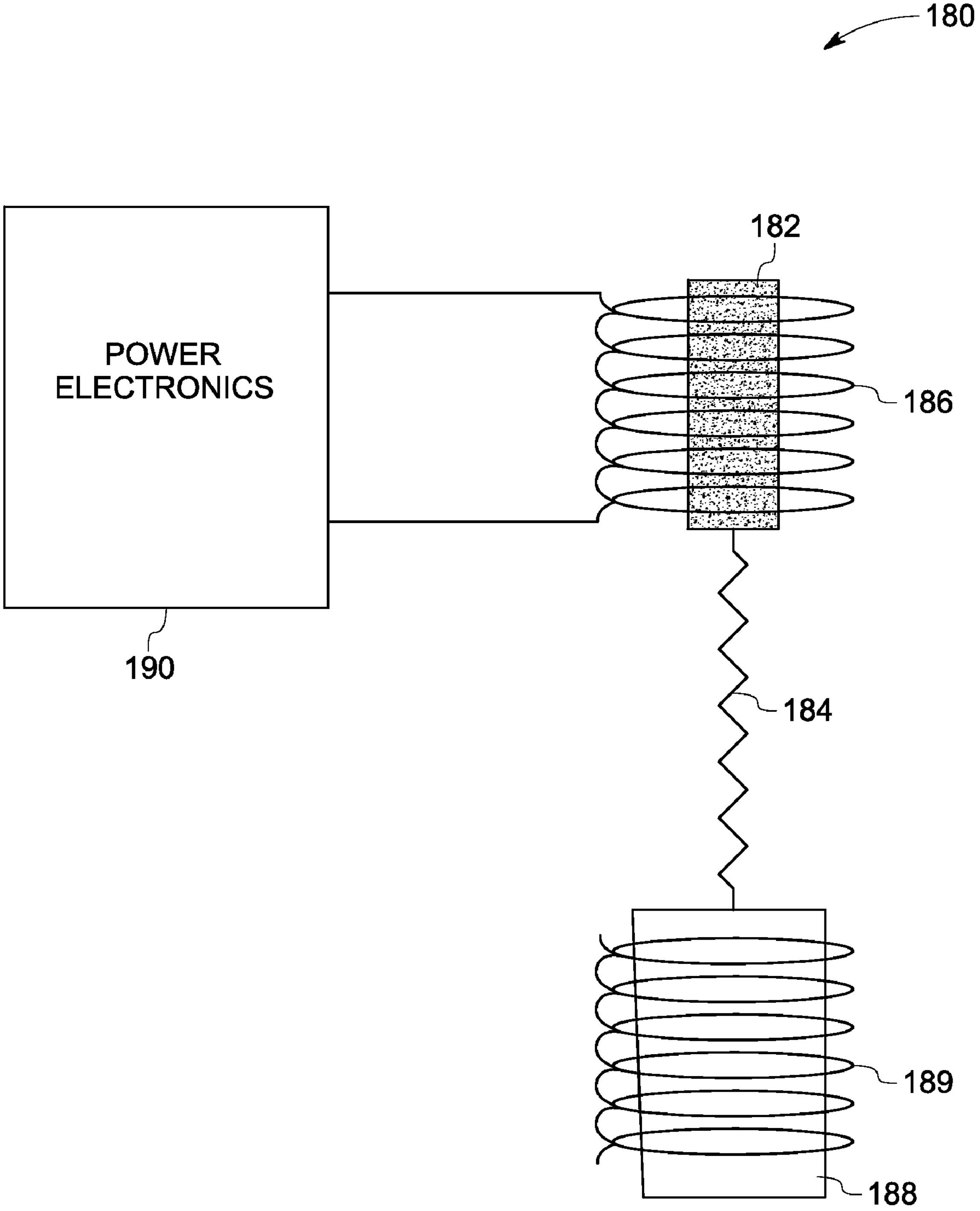
FIG. 7 is a diagrammatic representation of an exemplary embodiment for power harvesting using a magnet and a spring.

A second technique is illustrated by the embodiment 180 in FIG. 7 and utilizes a magnet 182 on a spring 184 that moves through the coil 186. The spring 184 is attached to the slug 188 which is lifted by the coil 189 (main coil). The impact of the slug 188 causes the magnet 182 to oscillate due to the spring 184. This motion of the magnet 182 from applied vibration creates a current in the coil 186 that can be conditioned with electronics via the device 190 into a usable form. In one embodiment (not shown), coil 186 and slug 188 are physically coupled so as to maintain the position of magnet 182 within coil 186.

A third technique (not shown) harvests the energy from radio frequency (RF) waves, or magnetic waves from a nearby transmitter, into a useful electrical source. In another technique (not shown), a coil may additionally be placed in the sensor on top of the slug to harvest power. A battery may additionally or alternatively be installed to power the sensors.

Figure 8:
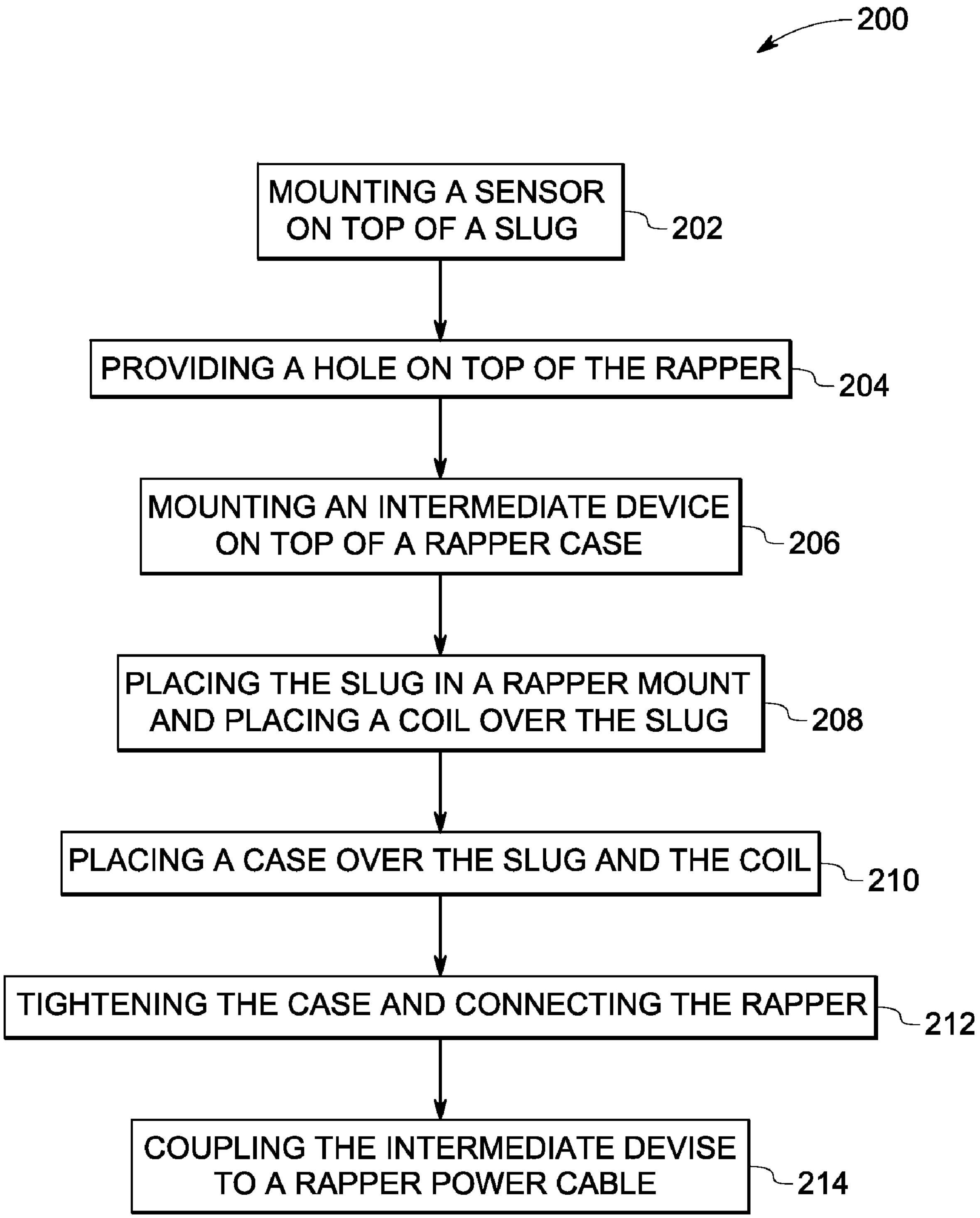
FIG. 8 is a flowchart showing exemplary steps for a method of retrofitting the rapper in the system of FIG. 1.

FIG. 8 is a flowchart 200 showing exemplary steps for a method of retrofitting an electrostatic precipitator, particularly the rappers. The method includes at step 202, mounting a sensor on the top of the slug. At step 204, a hole may be provided on top of the rapper (the hole may be drilled or any other machining techniques may be used). The hole is provided on top of a rapper case and is mainly for an antenna of the intermediate device to communicate with the sensors. The antenna can either just receive transmissions from the sensor, or the antenna can broadcast a query to the sensor, provide power to the sensor via RF energy harvesting, and ask the sensor to read its current memory that has previously stored sensor measurement information and return the results (similar to a radio frequency identification (RFID) tag). Alternatively, the hole could provide access for a wire from the sensor. Step 206 includes mounting the intermediate device on top of the rapper case. It may be noted that the sensors and intermediate device can be mounted with an adhesive taped backing, or a mechanical mounting, such as with screws or clips.

At step 208, the slug is then placed in a rapper mount and the coil is placed over the slug. At step 210 a case is then placed over the slug and the coil. At step 212 the case is tightened and the rapper is connected. Lastly, at step 214 the intermediate device is coupled to a rapper power cable. The structural elements in the rapper, namely the sensors, the slug, the intermediate device, and the coil as referred herein are same as referred to in the discussion with reference to FIG. 1. The rapper mount, rapper case, and rapper power cable are not shown in the drawings but are well known to those skilled in the art. Thus it would be appreciated by those skilled in the art that the embodiments and method described herein is suitable for existing rapper system retrofit and for new installations.

Figure 9:
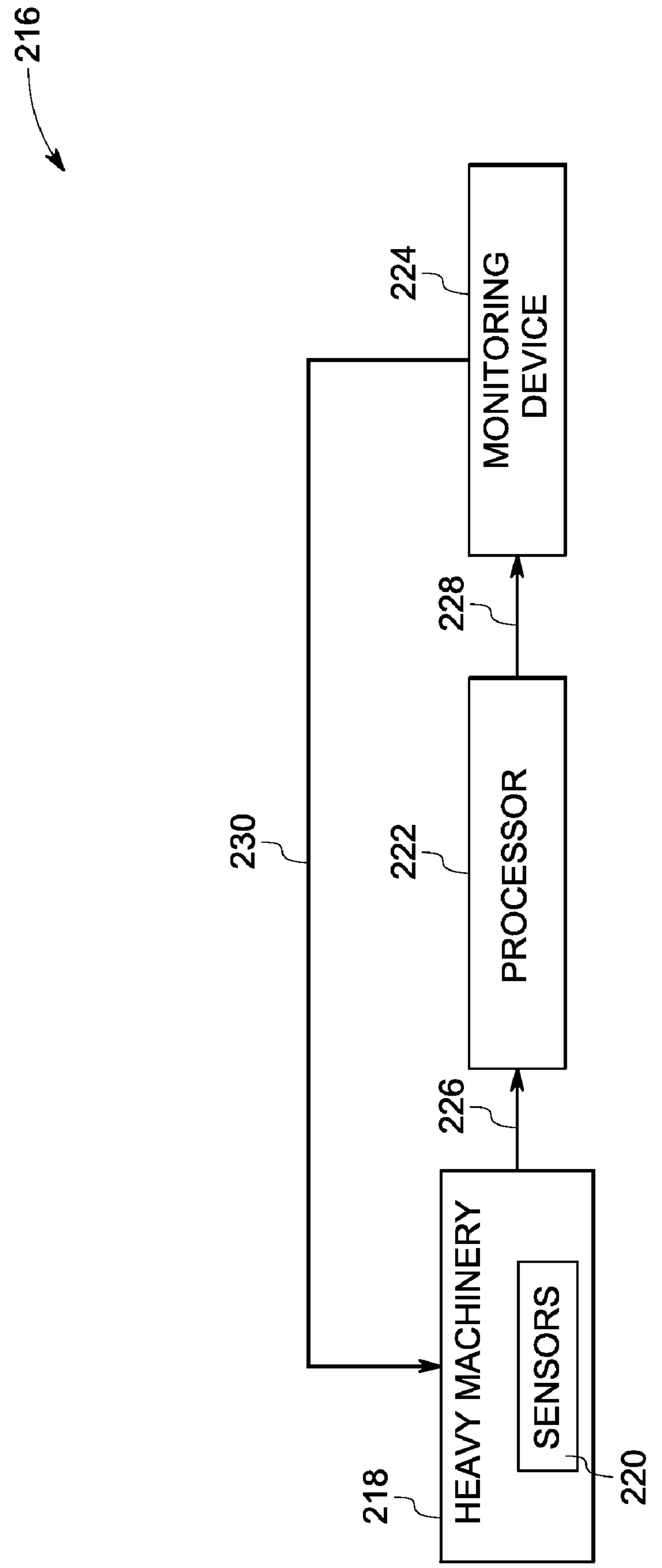
FIG. 9 is a diagrammatic representation of a system of monitoring operating condition of machinery with heavy vibrations.

It would be well appreciated by those skilled in the art that the system and method described herein with respect to the rapper system is equally applicable to other impact machinery (for example, machinery that undergoes heavy vibrations or machinery that creates an impact as part of its normal operation) or apparatus. Examples of useful embodiments include jack hammers, forging machinery, riveting machinery, stamping machinery, and cargo containers. The monitoring of such equipment is critical for both performance and safety reasons. FIG. 9 is a diagrammatic representation of a system 216 for monitoring operating condition of such apparatus 218. The system 216 includes one or more sensors 220 configured to obtain and transmit signals representative of vibration, motion, or current behavior of the machinery under an impact of vibrations. The system also includes a processor 222 configured to receive the signals 226 from the one or more sensors 220 and configured for detecting whether the machinery is mechanically actuated or not. The system further includes a monitoring device 224 to determine one or more operating parameters of the heavy machinery based on the signals 228 received from the processor 222 and to optionally send an alert signal 230 when an operating parameter falls above or below a threshold value. Although processor 222 and monitoring device 224 are shown as separate boxes for purposes of illustration, these devices may be physically either separated or integrated.

Figure 10:
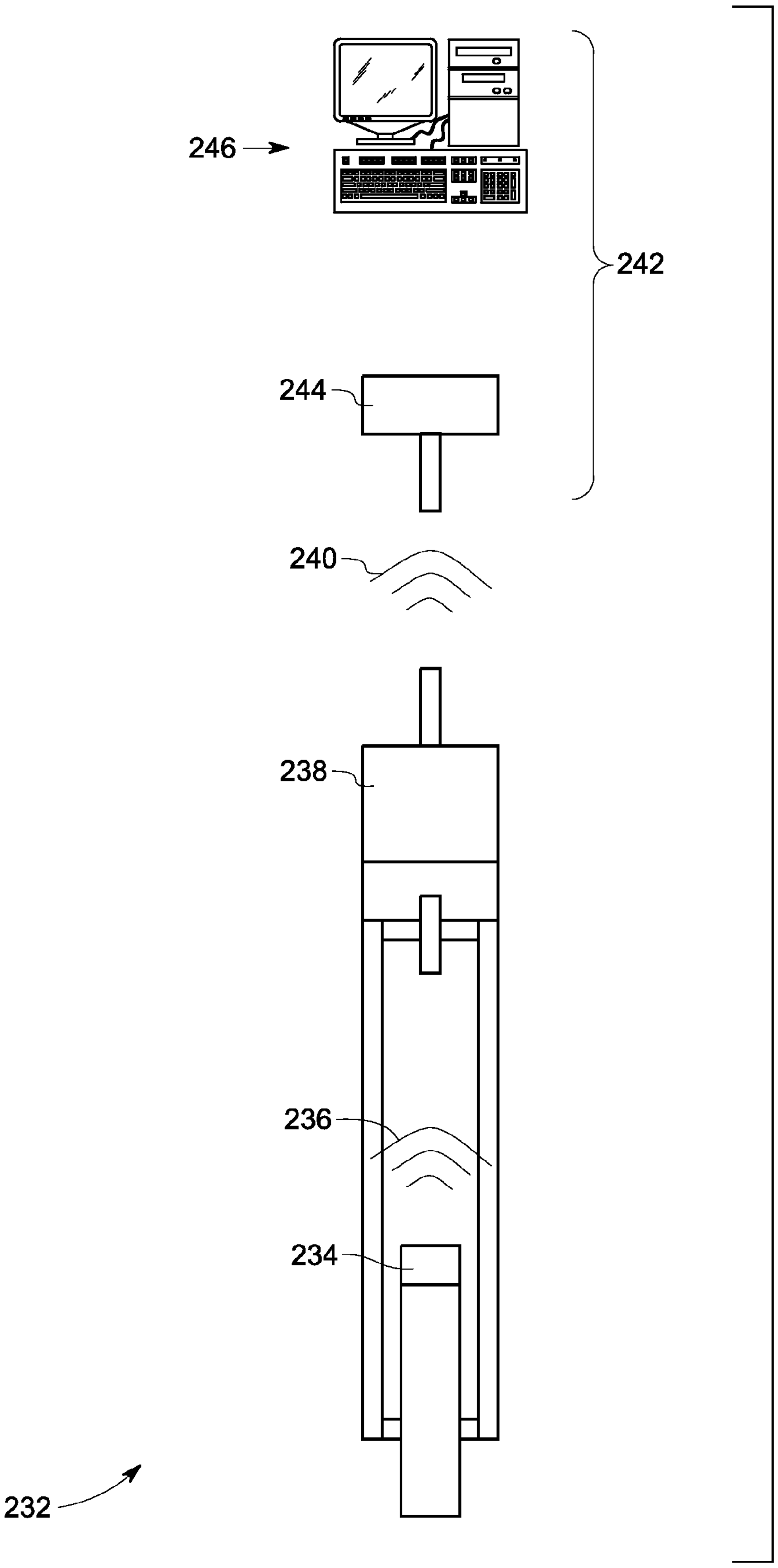
FIG. 10 is a diagrammatic representation of another exemplary system for monitoring the health of an electrostatic precipitator.

It should be noted by those skilled in the art that the impact machinery as employed in the rapper system or the jackhammer, the forging machinery, the riveting machinery, and the stamping machinery, often incorporates a heavy metal case around the impacting portion of the machine. This metal case may block transmission from an internal sensor. Therefore, in an exemplary embodiment as shown in FIG. 10, a system 232 for monitoring such impact machinery includes an internal sensor 234, an internal communication path 236, an external processing unit 238, an external communication path 240, and an external base station 242 to collect monitoring information via an external receiver 244. An external processor 246 is also provided to process the monitoring information and display/communicate any control/alert signals.

The embodiments described herein offer several advantages for monitoring the health of any impact machinery or apparatus. In the rapper system application, the system described with reference to FIGS. 1-6 can be easily integrated into the rapper and survive repeated rapper impacts. Power harvesting techniques as described herein provide enough energy to power the sensors and measure the force of vibration and height of the slug movement. The techniques described herein provide automated rapper monitoring and closed-loop control of the rappers and enable real time operational feedback. The advantages further include early detection of failed components, improved cleaning and collection efficiency of the electrostatic precipitators, reduced operating cost, and simple and low cost installation/retrofits.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for monitoring an operating condition of an electrostatic precipitator comprising a rapper configured to mechanically actuate to disengage pollutants from a plate of the electrostatic precipitator, the system comprising:

- a solenoid coil and a slug disposed within the solenoid coil, the solenoid coil configured to move the slug within the rapper when the solenoid coil is energized;
- a piezoelectric sensor disposed on the slug for movement therewith, said sensor configured to obtain and transmit signals representative of the movement of the slug within the rapper;
- an intermediate device electrically coupled to the sensor and configured to wirelessly transmit the signals received from the sensor; and
- a base station including a receiver configured to receive the signals from the intermediate device and a processor configured to determine whether the rapper is mechanically actuated.

2. The system of claim 1 further comprising a piezoelectric device disposed on the slug and configured to generate electrical energy in response to the movement of the slug, and wherein the electrical energy is used to power the piezoelectric sensor, the piezoelectric device, or both.

3. The system of claim 1 wherein the intermediate device is disposed on an outer surface of the rapper.

4. A system for monitoring an operating condition of an electrostatic precipitator comprising a rapper configured to mechanically actuate to disengage pollutants from a plate of the electrostatic precipitator, the system comprising:

- a solenoid coil and a slug disposed within the solenoid coil, the solenoid coil configured to move the slug within the rapper when the solenoid coil is energized;
- a sensor coupled to the solenoid coil and configured to obtain and transmit signals representative of the movement of the slug within the rapper; and
- a processor configured to receive the signals from the sensor and to determine a position or velocity of the slug within the rapper,
- wherein the sensor measures a time varying inductance of the solenoid coil based on the movement of the slug within the coil.

5. A system for monitoring an operating condition of an electrostatic precipitator comprising a rapper configured to mechanically actuate to disengage pollutants from a plate of the electrostatic precipitator, the system comprising:

- a solenoid coil and a slug disposed within the solenoid coil, the solenoid coil configured to move the slug within the rapper when the solenoid coil is energized;
- a sensor configured to obtain and transmit signals representative of the movement of the slug within the rapper; and
- a processor configured to receive the signals from the sensor for determining a position or velocity of the slug within the rapper,
- wherein the sensor comprises an ultrasound sensor for transmitting and receiving an acoustic waveform to and from the slug within the rapper, and wherein the processor is configured for using the time between transmission and reflection of the acoustic waveform to determine the position or velocity of the slug.

6. A system for monitoring an operating condition of an electrostatic precipitator comprising a rapper configured to mechanically actuate to disengage pollutants from a plate of the electrostatic precipitator, the system comprising:

a solenoid coil and a slug disposed within the solenoid coil, the solenoid coil configured to move the slug within the rapper when the solenoid coil is energized;

a sensor configured to obtain and transmit signals representative of the movement of the slug within the rapper; and a processor configured to receive the signals from the sensor for determining a position or velocity of the slug within the rapper, wherein the sensor comprises a capacitive sensor for measuring capacitance values with respect to multiple positions of a slug within the rapper, and wherein the processor is configured for using the capacitance values to determine a position of the slug within the rapper.

7. A system for monitoring an operating condition of an electrostatic precipitator comprising a rapper configured to mechanically actuate to disengage pollutants from a plate of the electrostatic precipitator, the system comprising:

a solenoid coil and a slug disposed within the solenoid coil, the solenoid coil configured to move the slug within the rapper when the solenoid coil is energized;

a sensor configured to obtain and transmit signals representative of the movement of the slug within the rapper;

a processor configured to receive the signals from the sensor for determining a position or velocity of the slug within the rapper;

a magnet attached to a slug by a spring; and a coil disposed around the magnet and configured to be energized for energy harvesting, wherein a motion of the magnet from applied vibration generated by the slug creates a current in the coil, the current being used for energy harvesting.

* * * * *